United States Patent
Woodward

(10) Patent No.: US 9,569,309 B2
(45) Date of Patent: Feb. 14, 2017

(54) MANAGING ERROR DATA AND RESETTING A COMPUTING SYSTEM

(71) Applicant: Intel Corporation, Santa Clara, CA (US)

(72) Inventor: James Woodward, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 14/042,918

(22) Filed: Oct. 1, 2013

(65) Prior Publication Data

US 2015/0095702 A1 Apr. 2, 2015

(51) Int. Cl.
*G06F 11/00* (2006.01)
*G06F 11/14* (2006.01)
*G06F 11/07* (2006.01)

(52) U.S. Cl.
CPC ....... *G06F 11/1441* (2013.01); *G06F 11/0706* (2013.01); *G06F 11/0787* (2013.01)

(58) Field of Classification Search
USPC ....................................................... 714/38.11
See application file for complete search history.

(56) References Cited

U.S. PATENT DOCUMENTS

| | | | |
|---|---|---|---|
| 7,062,677 B1* | 6/2006 | Chigurupati | G06F 11/3636 707/999.202 |
| 2002/0138790 A1* | 9/2002 | Nishtala | H04L 1/1642 714/43 |
| 2014/0380085 A1* | 12/2014 | Rash et al. | 714/3 |
| 2015/0006962 A1* | 1/2015 | Swanson et al. | 714/38.11 |

* cited by examiner

*Primary Examiner* — Sarai Butler
(74) *Attorney, Agent, or Firm* — International IP Law Group, P.L.L.C.

(57) ABSTRACT

Various techniques for managing a system reset of a computing system to maintain error data are described herein. In one example, a computing system configured for managing a system reset to maintain error data comprises a memory buffer device to receive a transaction from a system processor and to notify the system processor of an error in performing the transaction to volatile memory. In some examples, the system processor is configured to initiate a system reset of the computing system in response to the error, the system reset comprising a reset of the memory buffer device. Furthermore, the computing system includes an integrated circuit to block the reset of the memory buffer device to maintain error data in the volatile memory.

23 Claims, 3 Drawing Sheets

100

MANAGING ERROR DATA AND RESETTING A COMPUTING SYSTEM

TECHNICAL FIELD

This disclosure relates generally to techniques for managing error data and resetting a computing system. More specifically, the disclosure describes techniques for inhibiting the reset of certain devices or components during a system reset of a computing system, and preserving error data associated with the error prompting the system reset.

BACKGROUND

Computing systems may experience errors associated with software and hardware components or devices. As appreciated by the skilled artisan, such errors (e.g., uncorrectable errors) may prompt the system processor or controller (e.g., central processing device or CPU) of the computing system to perform a system-wide reset to reset various components or devices throughout the computing system. Unfortunately, data indicating the nature and details of the error experienced may be lost in the reset of the components, adversely impacting diagnostic evaluation of the computing system.

DETAILED DESCRIPTION

This disclosure relates generally to techniques for managing system reset and preserving error data in computing systems. More specifically, the disclosure describes techniques for inhibiting reset of certain devices or components during a system reset, and thus facilitating the saving of error data associated with the error prompting the system reset. Embodiments accommodate a computing system with a processor (e.g., CPU) having an internal memory controller in communication with a memory buffer device (e.g., Intel® Jordan Creek™) of volatile memory (e.g., random access memory or RAM).

In a typical operation, the processor may send a transaction (such as a request for a memory address) to the memory buffer device. Occasionally, the memory device may experience an error in performing the transaction, and the error may prompt the processor to initiate a system reset. Unfortunately, when the system reset reaches and resets the memory buffer device, the memory buffer device may lose data, clearing error logs.

Thus, with embodiments of the present techniques upon a system-wide or system reset implemented by the processor in response to a computing system error (e.g., a catastrophic or uncorrectable error), a programmable logic device (PLD), for instance, is configured to block the reset of the memory buffer device directed by the system reset. Further, the PLD or another PLD may also be configured to block resets (directed by the system reset) of additional devices generating the error and/or storing error data that would be cleared or loss upon reset. The system reset may be allowed to proceed to other components or devices of the computing system.

Additionally, the processor is configured to query the memory buffer device (or other devices) after the system reset and retrieve error data (e.g., error codes or bits). The processor may store the error data to nonvolatile memory such as a hard drive or flash drive. Advantageously, availability of such saved error data, which may have been lost if not blocking reset of the memory buffer device (or other devices), can aid in diagnostic evaluation of the computing system. For instance, the error data may identify the type of error experienced, the error source, and so on.

Figure 1:
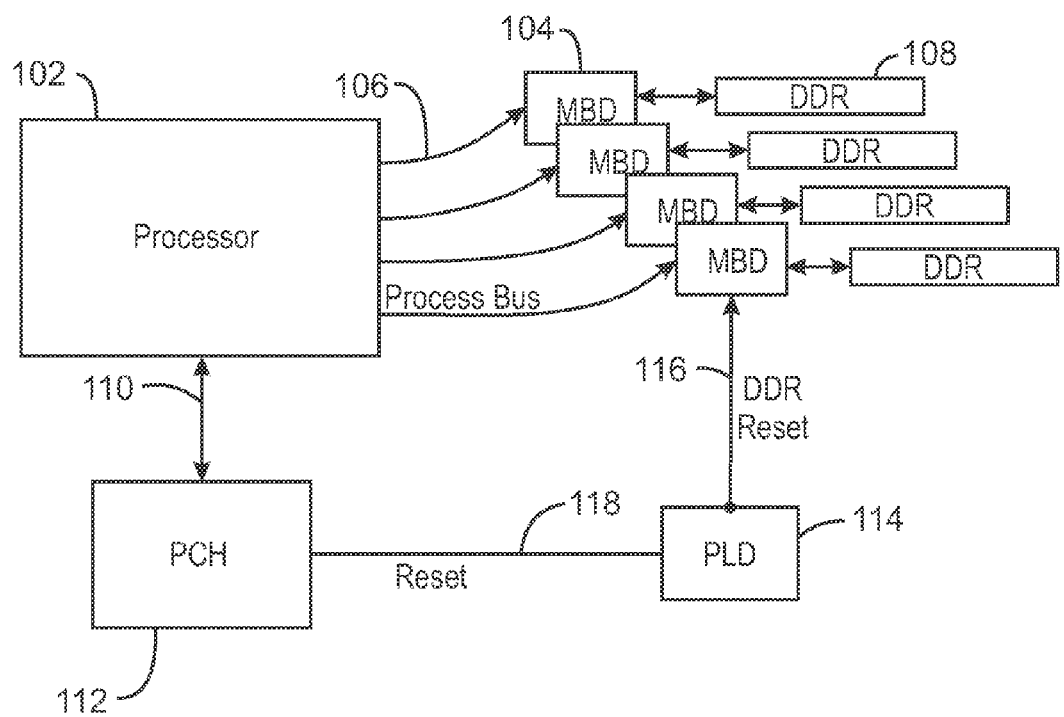
FIG. 1 is a diagrammatical representation of a computing system in accordance with embodiments of the present techniques.

FIG. 1 is an exemplary computing system 100 having a system processor 102 in communication with a plurality of memory buffer devices (also referred to herein as MBD) 104 over respective process buses 106. The system processor 102 has an integrated memory controller (and may also have integrated graphics iGFX, for instance). The system processor 102 may represent a plurality of system processors, each having one or more processor cores and a respective integrated memory controller.

The memory buffer devices 104 may each include a controller, integrated circuit, memory, and so on. In one example, the memory buffer devices 104 are an integrated circuit (IC) providing an interface and converter between a high-speed processor bus 106 and the volatile memory 104 (e.g., RAM). In a particular example, the memory buffer devices 104 are scalable memory buffers such as Intel® Jordan Creek™ memory buffer devices.

As appreciated by the skilled artisan, the memory buffer devices 104 are typically associated with respective volatile memory (also referred to herein as DDR) 108 (e.g., RAM, among others). In one example, the volatile memory 108 is double data rate (DDR) synchronous dynamic random-access memory (SDRAM). In examples where the process bus is a proprietary bus (e.g., Intel® scalable memory interconnect or SMI™) associated with the system processor 102, the memory buffer devices 104 may be configured to translate the communication or transaction between the system processor 102 and the volatile memory 108. For instance, the memory buffer device 104 may translate the transaction or communication from a proprietary processor 102/process bus 106 to an industry-standard memory 104 (e.g., DDR) transaction.

Further, the processor 102 is in communication over a data bus 110 (e.g., a high-speed data bus) with a chipset 112 such as a platform controller hub (PCH) configured to interface with components (not shown) such as various input/output (I/O) devices and read-only memory (ROM), for example. Variations of the chipset 112 may include other hub architectures (e.g., I/O hub), a south bridge, and/or partial north bridge, and so forth.

In the illustrated embodiment, an integrated circuit 114 (e.g., PLD) associated with or part of the chipset 112 is programmed both to implement and block the reset 116 of the memory buffer devices 104 and associated volatile memory 108. For example, during certain instances of a system reset 118 by the system processor 102 caused by an error, the integrated circuit 114 blocks the reset 116 of the memory buffer device 104 (and volatile memory 108) having the error data (e.g., error codes or error status bits)

related to the error prompting the system-wide reset. The system reset may proceed to other devices.

Thus, in examples desiring to save error data associated with a memory error prompting a system reset, the system reset (in response to the memory error) may generally proceed to devices other than the memory buffer device 104 (and volatile memory 108) having the desired error data. Of course, the integrated circuit 114 may also be programmed to reset 116 the memory buffer devices 104, such as when a reset of the memory buffer devices 104 is intentional or desired.

Moreover, the reset of devices other than the memory buffer device may also be blocked or inhibited during a system reset. Indeed, one or more integrated circuits (e.g., PLDs) may be programmed to block or inhibit reset of computing system devices generally having error data that would be lost upon reset and desired to be evaluated in the diagnosis or evaluation of the computing system 100. The system may access such devices post-system reset, for example, retrieve the error data maintained in the device, and then save the error data to another location to preserve the error data, facilitating diagnosis of the computing system and the error.

As depicted in the particular exemplary representation of FIG. 1, a reset 118 including a system reset affecting various components or devices within the computing system 10 is facilitated, at least in part, by the integrated circuit 114. The particular reset 116 of one or more of the memory buffer devices 104 may be blocked or implemented via the integrated circuit 114. (The system reset 118 and reset 116 of the memory buffer devices 108 may be sent over buses, for instance.) The reset 116 may be blocked (i.e., by the programmed integrated circuit 114) if desired to preserve error data stored in the memory buffer device 104 or the volatile memory 108. The reset 116 of the memory buffer device 116 may be implemented via the integrated circuit 114 when desired to reset the memory buffer device 104 and volatile memory 108.

Again, the blocking (by the integrated circuit 114) of reset of one or more of the memory buffer devices 104 during a system reset may prevent the purge or loss of error data residing in the memory buffer devices 104 and thus facilitate the system processor 102 to retrieve the error data. As mentioned, the system processor 102 may query the memory buffer device(s) 104 after the system reset to retrieve the maintained error data from the memory buffer devices 104 and/or volatile memory 108. To query the memory buffer device 104 after the system reset, the system processor 102 may re-initialize a proprietary process bus 106 or employ a side (e.g., I2C) bus, for example. The system processor 102 may be configured to store or save the retrieved error data to nonvolatile memory (not shown) such as a hard drive, flash drive, network drive, network storage device, and the like.

The error experienced at the memory buffer device in performing the memory transaction or operation from the system processor at the volatile memory (e.g., DDR RAM) may include correctable error threshold counts, error correction code (ECC) counts, correctable counts, catastrophic errors, uncorrectable errors such as address parity errors and other uncorrectable errors, and other types of hardware or memory errors. In general, the memory error may be an error that prompts a system reset.

In one example, the error is an uncorrectable error in which an address bit gets "flipped" or a parity bit inverted during a memory transaction at the memory buffer device 104 to the memory 108 (DDR memory in this example). The memory buffer device 104 notifies the system processor 102 of the error. The error prompts the system processor to initiate a system reset. The integrated circuit 114 blocks the reset 116 of the memory buffer device 104 directed by the system reset.

It should be noted that while the description herein may focus at times on memory buffer devices or blocking reset of the memory buffer devices, embodiments of the present techniques apply to blocking the reset of various devices or components of a computing system. The techniques may apply generally to devices generating an error, devices with the capability to store error data and subject to a reset, and so on. In other words, embodiments take error sourcing into account in the reset architecture. Moreover, such embodiments may be applied to new computing systems and/or to the update or retrofit of existing computing systems and architectures.

Lastly, as appreciated by the skilled artisan, the depiction of the computing system 100 is FIG. 1 is a simplified representation with various components and devices of the computing system 100 not shown for clarity. Furthermore, the techniques described herein including the representations given in FIGS. 1 and 2 relate to exemplary systems and methods of which the computing architecture will be understood by one of ordinary skill in the art with the benefit of the present disclosure. As appreciated by the skilled artisan, such architecture may include hardware and logic instructions or code stored in computer readable media (memory) and executable by the hardware such as a processor (e.g., CPU), controller (e.g., memory controller), integrated circuits including programmed integrated circuits, and other structure.

Figure 2:
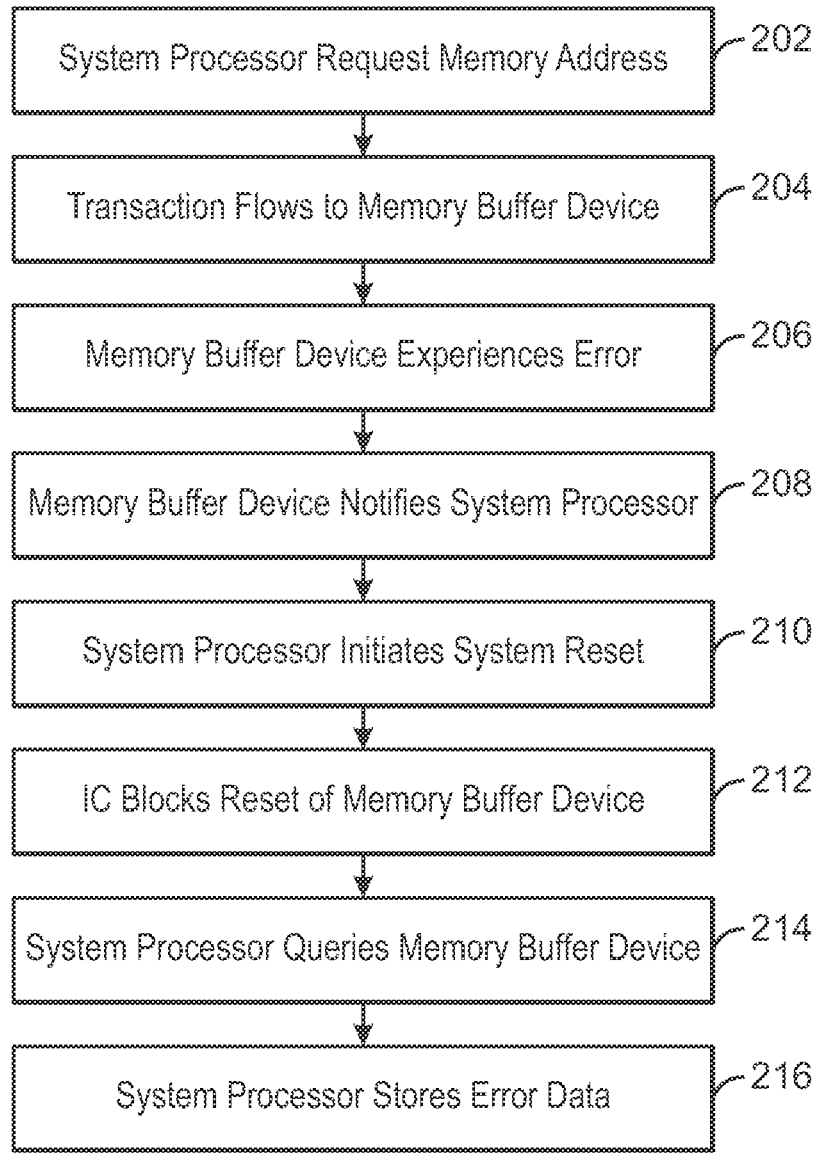
FIG. 2 is a block flow diagram of a method of managing a system reset and preserving error data in a computing system in accordance with embodiments of the present techniques.

FIG. 2 is an exemplary method 200 of managing a system reset and preserving error data in a computing system. Initially, in a typical operation, a system processor (e.g., CPU) of the computing system initiates (block 202) a transaction such as a request for a memory address from a memory buffer device (e.g., Intel® Jordan Creek™) associated with volatile memory (e.g., DDR RAM). The requested transaction from the system processor flows (block 204) over a process bus to the memory buffer device. Adversely, the memory buffer device experiences (block 206) an error in performing the transaction to the volatile memory. The memory buffer device notifies (block 208) the system processor of the error. In response, the system processor initiates (block 210) a system reset of the computing system. The system reset may be facilitated via a chipset such as a PCH and PLD, for example.

To maintain error data (in the memory buffer device and volatile memory) associated with the error prompting the system reset, the PLD, for example, blocks (block 212) the system reset from resetting the memory buffer device. The system reset may be allowed to reset other devices or components within the computing system. The system processor, such as after the system reset, queries (block 214) the memory buffer device for error data such as error codes. The error codes may be status bits in volatile memory, for instance. Lastly, the system processor retrieves and stores (block 216) the error data (e.g., error codes) in nonvolatile memory, such as a hard drive, flash drive, network drive, and the like. Advantageously, the save error data may be used in the diagnostic evaluation of the computing system and its performance.

Figure 3:
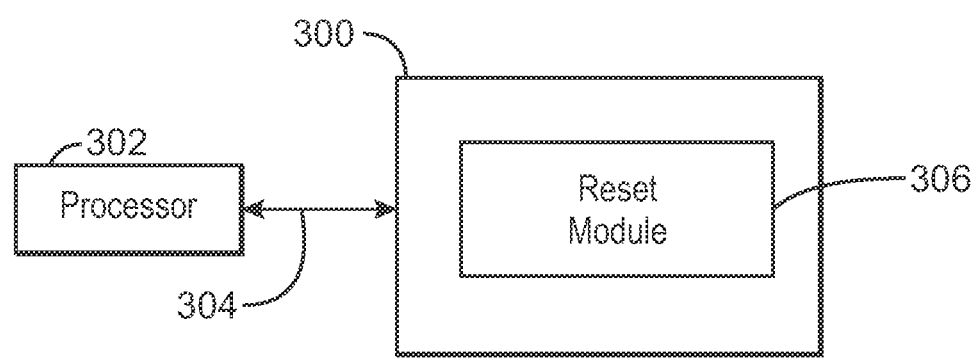
FIG. 3 is a block diagram depicting an example of a tangible, non-transitory computer-readable medium that can manage a system reset and preserve error data in a computing system in accordance with embodiments of the present techniques.

FIG. 3 is a block diagram depicting an example of a tangible, non-transitory computer-readable medium that can manage a system reset and preserve error data in a computing system. The tangible, non-transitory, computer-readable medium 300 may be accessed by a processor 302 over a computer interconnect 304. Furthermore, the tangible, non-transitory, computer-readable medium 300 may include code to direct the processor 302 to perform the operations of the techniques described above.

The various software components discussed herein may be stored on the tangible, non-transitory, computer-readable medium 300, as indicated in FIG. 3. For example, a reset module 306 may be adapted to direct the processor 302 to manage a system reset and preserve error data in a computing system. In some embodiments, the reset module 306 may receive a notification of an error and initiate a system reset in response to the error. In some examples, to maintain error data (in a memory buffer device and volatile memory) associated with the error prompting the system reset, the reset module 306 may prevent the memory buffer device from resetting. It is to be understood that any number of additional software components not shown in FIG. 3 may be included within the tangible, non-transitory, computer-readable medium 300, depending on the specific application.

Example 1

A computing system configured for managing a system reset to maintain error data is described herein. The computing system includes a memory buffer device to receive a transaction from a system processor and to notify the system processor of an error in performing the transaction to volatile memory. In embodiments, the transaction may include a request for a memory address, and the error may include an uncorrectable error. The system processor (e.g., CPU) may have an integrated memory controller to provide the transaction over a process bus to the memory buffer device.

The system processor is configured to initiate a system reset of the computing system in response to the error, the system reset including a reset of the memory buffer device. The computer system includes an integrated circuit to block the reset of the memory buffer device so to maintain error data (e.g., an error code as a status bit) in the volatile memory. The integrated circuit may be a programmable logic device (PLD) programmed to block the system reset from resetting the memory buffer device. The integrated circuit may be configured to reset the memory buffer device outside of the system reset initiated in response to the error. The integrated circuit may be configured to reset the memory buffer device after the system processor preserves the error data. In embodiments, the system processor may be configured to query, after the system reset, the memory buffer device for the error data in the volatile memory and to store the error data to nonvolatile memory.

Example 2

A method for a computing system having a system processor and a memory buffer device is described herein. The method includes requesting, via the system processor, a transaction with volatile memory, wherein the transaction flows from the system processor over a process bus to the memory buffer device. An error is experienced at the memory buffer device in performing the transaction to the volatile memory. The method includes notifying, via the memory buffer device, the system processor of the error. The method includes initiating, via the system processor, a system reset of the computing system in response to the error, the system reset including a reset of the memory buffer device. The method includes blocking, via an integrated circuit (e.g., PLD), the reset of the memory buffer device so to maintain error data in the volatile memory.

In embodiments, the error data is an error code as a status bit in the volatile memory. The method may include querying, via the system processor, the memory buffer device for the error data in the volatile memory. Further, the method may include saving to nonvolatile memory the error data queried from the memory buffer device and the volatile memory. In embodiments, the method includes resetting, via the system processor and the integrated circuit, the memory buffer device after the system processor stores the error data to nonvolatile memory. In embodiments, the transaction is or includes a request for a memory address. The error may be or include an uncorrectable error.

Example 3

A method of diagnosing a computing system is described herein. The method includes managing a system reset to maintain an error code in volatile memory of the computing system, the error code associated with an error experienced at a memory buffer device of the computing system in performing a memory transaction. The system reset is initiated by a system processor of the computing system in response to the error. The method includes querying, via the system processor after the system reset, the memory buffer device for the error code in the volatile memory. The method includes storing, via the system processor, the error code to nonvolatile memory.

In embodiments, managing the system reset includes, via an integrated circuit of the computing system, blocking a reset of the memory buffer device directed by the system reset. In embodiments, the transaction is or includes a request from the system processor for a memory address, and the error is or includes an uncorrectable error. The method may include determining a source of the error based on the error data.

Example 4

A non-transitory, computer-readable medium comprising a plurality of instructions that, in response to being executed on a computing device, cause the computing device to manage a system reset is described herein. The plurality of instructions can cause a computing device to request a transaction with volatile memory, wherein the transaction flows from a system processor over a process bus to a memory buffer device and detect an error at the memory buffer device in performing the transaction to the volatile memory. The plurality of instructions can also cause a computing device to notify the system processor of the error and initiate a system reset of the computing system in response to the error, the system reset comprising a reset of the memory buffer device. Furthermore, the plurality of instructions can cause the computing device to block the reset of the memory buffer device so to maintain error data in the volatile memory.

In some embodiments, the instructions cause the computing device to query the memory buffer device for the error data in the volatile memory. The instructions can also cause the computing device to save to nonvolatile memory the error data queried from the memory buffer device and the volatile memory. In some embodiments, the instructions can cause the computing device to reset the memory buffer device after the system processor stores the error data to nonvolatile memory. In some examples, error data comprises an error code comprising a status bit in the volatile memory.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing system configured for managing a system reset to maintain error data, the computing system comprising:
   a memory buffer device to receive a transaction from a system processor and translate the transaction between the system processor and volatile memory, the volatile memory comprising random access memory (RAM), wherein the memory buffer device to notify the system processor of the memory buffer device experiencing an error in the memory buffer device performing the transaction to the volatile memory;
   the system processor configured to initiate a system reset of the computing system in response to the error, the system reset comprising a reset of the memory buffer device; and
   an integrated circuit comprising a programmable logic device (PLD) to block the reset of the memory buffer device so to maintain error data in the volatile memory.

2. The computing system of claim 1, wherein the error data comprises an error code comprising a status bit.

3. The computing system of claim 1, wherein the system processor is configured to query, after the system reset, the memory buffer device for the error data in the volatile memory and to store the error data to nonvolatile memory.

4. The computing system of claim 1, wherein the integrated circuit is configured to reset the memory buffer device after the system processor preserves the error data.

5. The computing system of claim 1, wherein the integrated circuit is configured to reset the memory buffer device outside of the system reset initiated in response to the error.

6. The computing system of claim 1, wherein the transaction comprises a request for a memory address, and the error comprises an uncorrectable error.

7. The computing system of claim 1, wherein the programmable logic device (PLD) programmed to block the system reset from resetting the memory buffer device.

8. The computing system of claim 1, wherein the system processor comprises a central processing unit (CPU) having an integrated memory controller to provide the transaction over a process bus to the memory buffer device.

9. A method for a computing system having a system processor and a memory buffer device, the method comprising:
   requesting, via the system processor, a transaction with volatile memory comprising random access memory (RAM), wherein the transaction flows from the system processor over a process bus to the memory buffer device;
   the memory buffer device translating the transaction between the process bus and the volatile memory;
   the memory buffer device performing the transaction to the volatile memory;
   the memory buffer device experiencing an error in performing the transaction to the volatile memory;
   the memory buffer device notifying the system processor of the error;
   initiating, via the system processor, a system reset of the computing system in response to the error, the system reset comprising a reset of the memory buffer device; and
   blocking, via an integrated circuit comprising a programmable logic device (PLD), the reset of the memory buffer device so to maintain error data in the volatile memory.

10. The method of claim 9, wherein the error data comprises an error code comprising a status bit in the volatile memory.

11. The method of claim 9, comprising querying, via the system processor, the memory buffer device for the error data in the volatile memory.

12. The method of claim 11, comprising saving to nonvolatile memory the error data queried from the memory buffer device and the volatile memory.

13. The method of claim 12, comprising resetting, via the system processor and the integrated circuit, the memory buffer device after the system processor stores the error data to nonvolatile memory.

14. The method of claim 9, wherein the transaction comprises a request for a memory address.

15. The method of claim 9, wherein the error comprises an uncorrectable error.

16. A method of diagnosing a computing system, comprising:
managing a system reset to maintain an error code in volatile memory of the computing system, the error code associated with an error experienced at a memory buffer device of the computing system in the memory buffer device performing a memory transaction to the volatile memory comprising random access memory (RAM);
the memory buffer device notifying a system processor of the computing system of the error, and wherein the system reset is initiated by the system processor in response to the error, wherein managing the system reset comprises blocking, via programmable logic device (PLD) of the computing system, a reset of the memory buffer device directed by the system reset;
querying, via the system processor after the system reset, the memory buffer device for the error code in the volatile memory; and
storing, via the system processor, the error code to nonvolatile memory.

17. The method of claim 16, wherein the transaction comprises a request from the system processor for a memory address, and the error comprises an uncorrectable error.

18. The method of claim 16, comprising determining a source of the error based on the error data.

19. A non-transitory, computer-readable medium comprising a plurality of instructions that, in response to being executed on a computing device, cause the computing device to:
request a transaction with volatile memory comprising random access memory (RAM) of the computing device, wherein the transaction flows from a system processor over a process bus to a memory buffer device of the computing device, the memory buffer device to translate the transaction from the process bus to the volatile memory;
detect an error at the memory buffer device in the memory buffer device performing the transaction to the volatile memory;
notify by the memory device the system processor of the error;
initiate a system reset of the computing system in response to the error, the system reset comprising a reset of the memory buffer device; and
block by a programmable logic device (PLD) of the computing device the reset of the memory buffer device so to maintain error data in the volatile memory.

20. The non-transitory, computer-readable medium of claim 19, wherein the error data comprises an error code comprising a status bit in the volatile memory.

21. The non-transitory computer-readable medium of claim 19, wherein the instructions cause the computing device to query the memory buffer device for the error data in the volatile memory.

22. The non-transitory computer-readable medium of claim 21, wherein the instructions cause the computing device to save to nonvolatile memory the error data queried from the memory buffer device and the volatile memory.

23. The non-transitory computer-readable medium of claim 19, wherein the instructions cause the computing device to reset the memory buffer device after the system processor stores the error data to nonvolatile memory.

* * * * *